United States Patent
Takahashi

(10) Patent No.: US 10,672,194 B2
(45) Date of Patent: Jun. 2, 2020

(54) EDITING DEVICE FOR THREE-DIMENSIONAL SHAPE DATA, AND NON-TRANSITORY COMPUTER READABLE MEDIUM STORING THREE-DIMENSIONAL SHAPE-DATA EDITING PROGRAM

(71) Applicant: FUJI XEROX CO., LTD., Tokyo (JP)

(72) Inventor: Tomonari Takahashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/787,828

(22) Filed: Oct. 19, 2017

(65) Prior Publication Data

US 2018/0330550 A1    Nov. 15, 2018

(30) Foreign Application Priority Data

May 15, 2017    (JP) .................................. 2017-096491

(51) Int. Cl.
  *G06T 19/20*    (2011.01)

(52) U.S. Cl.
  CPC ...... *G06T 19/20* (2013.01); *G06T 2219/2016* (2013.01)

(58) Field of Classification Search
  CPC ......... G06T 11/008; G06T 9/40; G06T 15/08; G06T 17/005; G06T 2200/04; G06T 19/20; G06T 2219/2016
  See application file for complete search history.

(56) References Cited

U.S. PATENT DOCUMENTS

| | | | | |
|---|---|---|---|---|
| 6,407,738 B1* | 6/2002 | Wakabayashi | ........ | G06T 17/005 345/424 |
| 6,694,163 B1* | 2/2004 | Vining | .................... | G06T 17/00 128/920 |
| 8,217,939 B1* | 7/2012 | Bonciu | .................... | G06T 17/00 345/419 |
| 8,472,684 B1* | 6/2013 | Periaswamy | ........ | G06K 9/6289 382/128 |

(Continued)

FOREIGN PATENT DOCUMENTS

| | | |
|---|---|---|
| EP | 1321866 A1 | 6/2003 |
| JP | 07-210584 A | 8/1995 |

(Continued)

OTHER PUBLICATIONS

NPL Video Titled "Tutorial 9—Coordinate Systems in OpenGL", https://www.youtube.com/watch?v=pQcC2CqReSA; select screen shots included; published Mar. 12, 2013. (Year: 2013).*

(Continued)

*Primary Examiner* — Daniel F Hajnik
(74) *Attorney, Agent, or Firm* — Sughrue Mion, PLLC

(57) ABSTRACT

An editing device for three-dimensional shape data includes: an editor that edits a three-dimensional shape in a second coordinate system different from a first coordinate system, the three-dimensional shape being configurated by multiple voxels and represented by three-dimensional shape data in the first coordinate system; and a converter that converts the three-dimensional shape in the second coordinate system, which is edited by the editor using arrangement information that indicates a positional relationship between the multiple voxels, into a three-dimensional shape in the first coordinate system.

11 Claims, 13 Drawing Sheets

(56) References Cited

U.S. PATENT DOCUMENTS

| | | | |
|---|---|---|---|
| 2005/0151734 A1 | 7/2005 | Gubkin et al. | |
| 2017/0234952 A1* | 8/2017 | Zhang | G01R 33/4828 324/309 |

FOREIGN PATENT DOCUMENTS

| | | |
|---|---|---|
| JP | 2001-084395 A | 3/2001 |
| JP | 2002-149718 A | 5/2002 |
| WO | 2013/022804 A1 | 2/2013 |

OTHER PUBLICATIONS

NPL Video Titled "Advanced Tutorial—Create Minecraft Models w/t Voxel Editors", https://www.youtube.com/watch?v=6gZXm9p9zwl; select screen shots included; published Jan. 31, 2016. (Year: 2016).*

Qubicle Tutorial published on MindDesk.com on Apr. 19, 2016, Wayback Machine Copy of Minddesk website with Qubicle Tutorial published on MindDesk.com, Titled "11. Modifiers", https://web.archive.org/web/20160527080340/http://minddesk.com:80/learn/article.php?id=65&oid=17 (Year: 2016).*

Qubicle Tutorial published on MindDesk.com on Dec. 7, 2016, Titled "Translate, Scale, Rotate", https://getqubicle.com/learn/article.php?id=90 (Year: 2016).*

Smith, Adam M. "Two methods for voxel detail enhancement." Proceedings of the 2nd International Workshop on Procedural Content Generation in Games. ACM, 2011. (Year: 2011).*

NPL Video: Titled "MagicaVoxel—Using the Scale Tool to Create Detail on Low Voxel Models" published Feb. 2016, available for viewing at https://www.youtube.com/watch?v=fFbeEXoaHjk; select screenshots included. (Year: 2016).*

NPL Video Titled "How to Qubicle #4: Pixel to Voxel", published May 21, 2016 by Zach Soares—available for viewing at: https://www.youtube.com/watch?v=jQnF-TO8_8o; select screenshots included. (Year: 2016).*

Foley et al., "Computer Graphics: Principles and Practice", Addison Wesley, 2nd ed. in C, 1996, ISBN 0-201-84840-6, pp. 279-281. (Year: 1996).*

Communication dated Aug. 27, 2018 from the European Patent Office in counterpart application No. 18160377.0.

Hongliang Yu, "Automatic Rigid and Deformable Medical Image Registration," Worcester Polytechnic Institute in partial fulfillment of the requirements for the Degrees of Doctor of Philosophy in Mechanical Engineering; May 2005, 116 pages total.

Duygu Tosun-Turgut, Ph.D., "Rigid Image Registration," Center for Imaging of Neurodegenerative Diseases Department of Radiology and Biomedical Imaging; Jan. 2014, 44 pages total.

Thomas Fromherz, "Shape from Multiple Cues for 3D-Enhanced Face Recognition a Contribution to Error Reduction by Employing Inexpensive 3D Reconstruction Methods," Inaugural-Dissertation zur Erlangung der Philosophischen Doktorwurde; 1996, 120 pages total.

* cited by examiner

FIG. 6

| COORDINATES (X, Y, Z) | ELEMENT VALUE n |
|---|---|
| (1, 1, 1) | 4 |
| (1, 1, 2) | 3 |
| (1, 1, 3) | 2 |
| (1, 1, 4) | 1 |
| (2, 1, 1) | 4 |
| (2, 1, 2) | 3 |
| (2, 1, 3) | 2 |
| (2, 1, 4) | 1 |
| (3, 1, 1) | 4 |
| (3, 1, 2) | 3 |
| (3, 1, 3) | 2 |
| (3, 1, 4) | 1 |
| (4, 1, 1) | 0 |
| (4, 1, 2) | 0 |
| (4, 1, 3) | 0 |
| (4, 1, 4) | 1 |
| ⋮ | ⋮ |

FIG. 15

| | | 59 | 40WR | | |
|---|---|---|---|---|---|
| | | 1 | 1 | | |
| | 1 | 1 | 0 | 0 | |
| 1 | 1 | 2 | 3 | 0 | 0 |
| | 2 | 3 | 4 | 4 | |
| | | 4 | 4 | | |

EDITING DEVICE FOR THREE-DIMENSIONAL SHAPE DATA, AND NON-TRANSITORY COMPUTER READABLE MEDIUM STORING THREE-DIMENSIONAL SHAPE-DATA EDITING PROGRAM

CROSS-REFERENCE TO RELATED APPLICATIONS

This application is based on and claims priority under 35 USC 119 from Japanese Patent Application No. 2017-096491 filed on May 15, 2017.

BACKGROUND

Technical Field

The present invention relates to an editing device for three-dimensional shape data, and a non-transitory computer readable medium storing three-dimensional shape-data editing program.

SUMMARY

In order to achieve the above-mentioned object, an aspect of the invention provides an editing device for three-dimensional shape data including: an editor that edits a three-dimensional shape in a second coordinate system different from a first coordinate system, the three-dimensional shape being configured by multiple voxels and represented by three-dimensional shape data in the first coordinate system; and a converter that converts the three-dimensional shape in the second coordinate system, which is edited by the editor using arrangement information that indicates a positional relationship between the multiple voxels, into a three-dimensional shape in the first coordinate system.

BRIEF DESCRIPTION OF THE DRAWINGS

Exemplary embodiments of the present invention will be described in detail based on the following figures, wherein:

FIG. 6 is a table illustrating an example of arrangement information;

FIG. 15 is a diagram illustrating an example of a three-dimensional shape in the world coordinate system, which is converted using divided arrangement information;

DETAILED DESCRIPTION

Hereinafter, an exemplary embodiment for carrying out the present invention will be described in detail with reference to the drawings.

Figure 1:
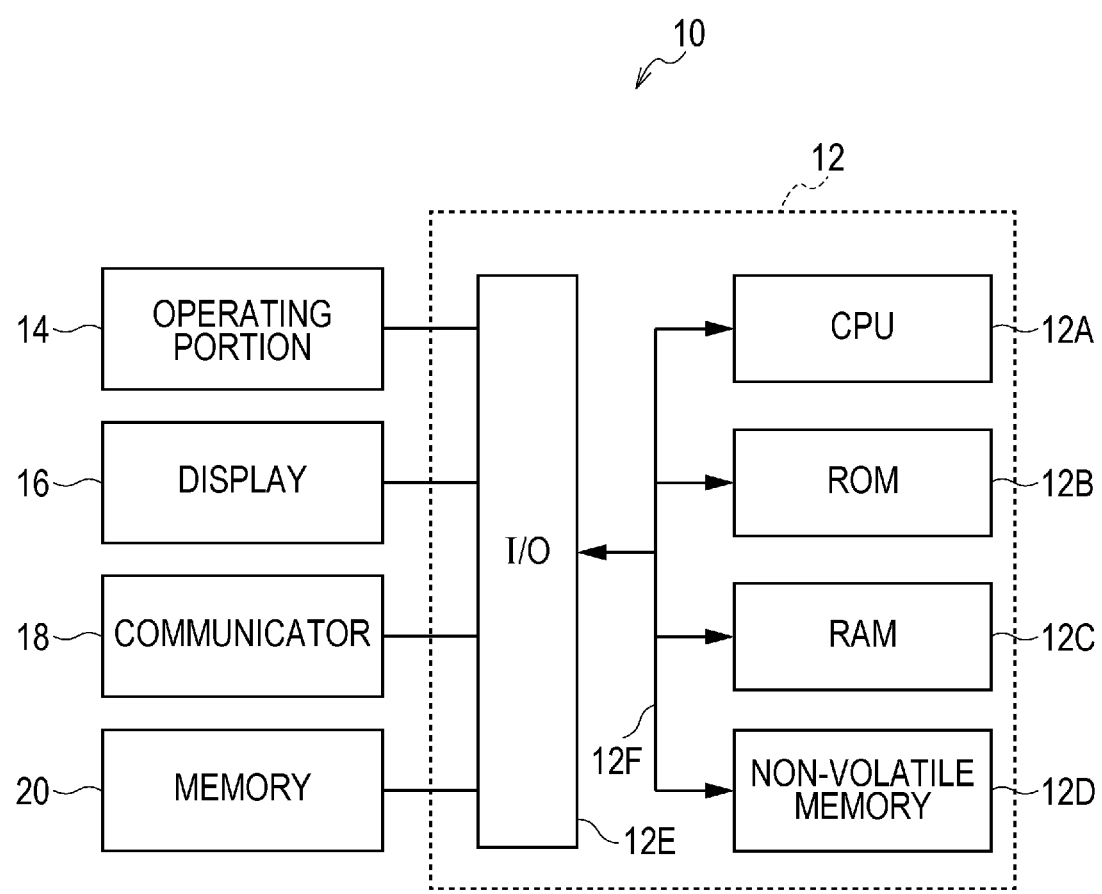
FIG. 1 is a diagram illustrating a configuration example of an editing device for three-dimensional shape data.

First, referring to FIG. 1, the configuration of an editing device 10 for three-dimensional shape data according to the exemplary embodiment will be described.

The editing device 10 is configured by, for instance, a personal computer, and includes a controller 12. The controller 12 includes a central processing unit (CPU) 12A, a read only memory (ROM) 12B, a random access memory (RAM) 12C, a non-volatile memory 12D, and an input/output (I/O) interface 12E. The CPU 12A, the ROM 12B, the RAM 12C, the non-volatile memory 12D, and the I/O 12E are connected to each other via a bus 12F.

Also, the I/O 12E is connected to an operating portion 14, a display 16, a communicator 18, and a memory 20. It is to be noted that the CPU 12A is an example of the editor and the converter.

The operating portion 14 is configured to include an input device such as a mouse, a keyboard, or a touch panel that receives an instruction from a user of the editing device 10, for instance.

The display 16 is configured to include a display device such as a liquid crystal display and an organic electro luminescence (EL) display, for instance.

The communicator 18 is connected to a communication line, for instance, the Internet or a local area network (LAN), and has an interface for performing data communication with an external device such as a personal computer connected to the communication line.

The memory 20 is configured to include a non-volatile memory device such as a hard disk, and stores the later-described editing program for three-dimensional shape data, and three-dimensional shape data to be edited. The CPU 12A reads and executes the editing program for three-dimensional shape data stored in the memory 20.

Figure 2:
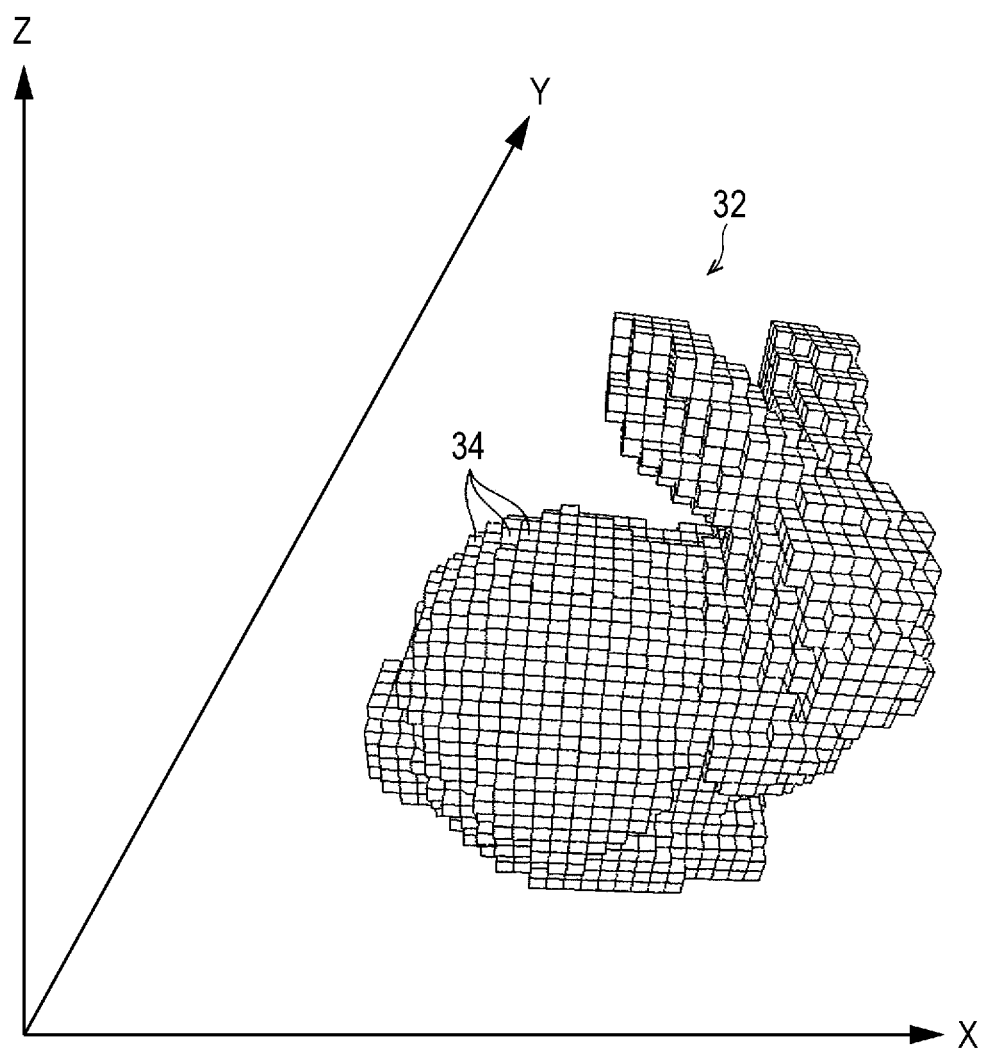
FIG. 2 is a diagram illustrating an example of a three-dimensional shape.

FIG. 2 is a diagram illustrating an example of a three-dimensional shape 32 indicated by three-dimensional shape data. As illustrated in FIG. 2, the editing device 10 represents the three-dimensional shape 32 using the three-dimensional coordinates space formed by X-axis, Y-axis, and Z-axis that are perpendicular to each other.

In this exemplary embodiment, as a data format for three-dimensional shape data, the data format that represents the three-dimensional shape 32 by a set of voxels 34 is used.

Here, the voxels 34 are each basic element of the three-dimensional shape 32, and for instance, a rectangular parallelepiped is used. However, without being limited to a rectangular parallelepiped, a sphere or a cylinder may be used. In the exemplary embodiment, a case where each voxel 34 is a cube will be described. A desired three-dimensional shape 32 is represented by stacking the voxels 34. Also, for each voxel 34, an attribute indicating a property of the voxel 34, for instance, a color, a strength, a material quality, or a texture is specified, and the color or the material quality of the three-dimensional shape 32 is represented by presence of the voxel 34 and the attribute of the voxel 34.

Here, the "material quality" includes at least one of information indicating a genre of material such as resin, metal, or rubber, information indicating a material name such as ABS, PLA, information indicating a product name, a product number of a commercially available material, information indicating a material such as a material name an abbreviation, and a number which are defined in a standard such as ISO, JIS, and information indicating material characteristics such as a thermal conductivity, an electrical conductivity, and magnetism.

Furthermore, the "texture" also includes an attribute indicating not only a color, but also appearance or touch of three-dimensional shape data, in addition to a reflectivity, a transmittance, gloss, and a surface property thereof.

It is to be noted that the attribute includes an attribute pattern which is set using at least one of a period, an expression, and another three-dimensional shape data. The attribute pattern includes at least one of repeat of a constant period, gradation, representation by a slope or a local point expressed by an expression, continuous modification of the color, material quality, or texture of three-dimensional shape data in accordance with another three-dimensional shape data, and filling or continuously modifying a specified range of three-dimensional shape data with a specified pattern.

As described above, the three-dimensional shape 32 is represented by a set of voxels 34, and specifically is represented by, for instance, an element value n of X, Y, Z coordinates in a three-dimensional coordinate space. Here, n is an integer greater than or equal to 0. Let (X, Y, Z) represent coordinates in a three-dimensional coordinate space, then when a voxel 34 is present at the coordinates (X, Y, Z), n is set to an integer greater than or equal to 1. On the other hand, when a voxel 34 is not present at the coordinates (X, Y, Z), n is set to 0. The three-dimensional shape 32 is represented in this manner.

It is to be noted that when n is greater than or equal to 1, n indicates an attribute of the voxel. For instance, n=2 indicates that the material of the voxel is A, and the color is red, and n=3 indicates that the material of the voxel is B, and the color is green. In other words, there is one-to-one correspondence between the value of n and the attribute of a voxel.

In addition, no restriction is imposed on the shape of the three-dimensional shape 32, and the three-dimensional shape 32 may have any shape as long as the shape is represented by using three-dimensional shape data.

Figure 3:
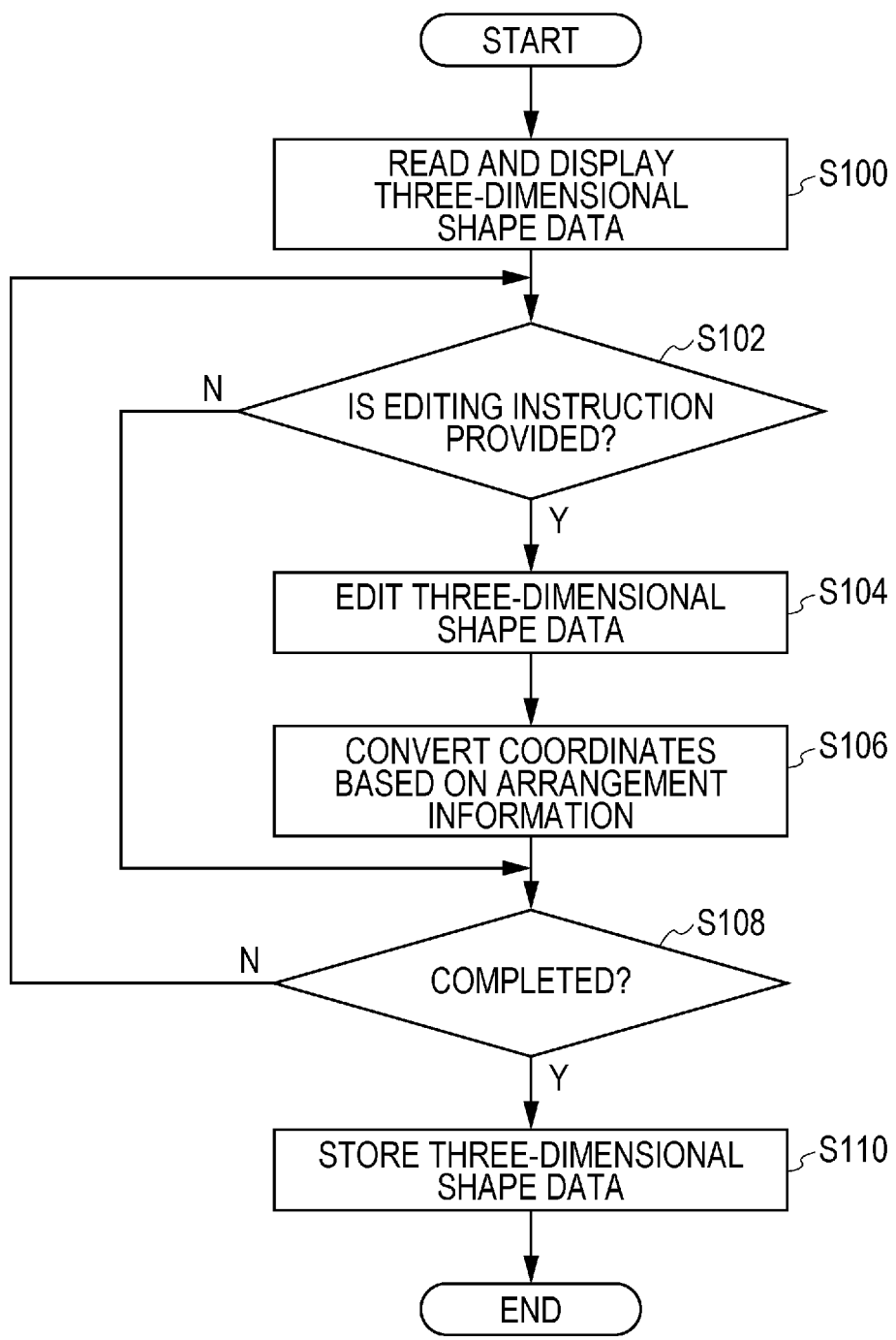
FIG. 3 is a flowchart illustrating an example of a flow of edit processing of three-dimensional shape data.

Next, the operation of the editing device 10 according to the exemplary embodiment will be described with reference to FIG. 3. The CPU 12A reads and executes the editing program for three-dimensional shape data, thereby performing the edit processing illustrated in FIG. 3. It is to be noted that the edit processing illustrated in FIG. 3 is performed, for instance when execution of the editing program is instructed by an operation of a user.

In step S100, three-dimensional shape data to be edited is read from the memory 20, and a three-dimensional shape object based on the read three-dimensional shape data is displayed on the display 16.

In step S102, it is determined whether or not an editing instruction is provided for the three-dimensional shape displayed on the display 16 by an operation of a user. When the determination is affirmative, the flow proceeds to step S104, and when the determination is negative, the flow proceeds to step S108.

In step S104, the three-dimensional shape displayed on the display 16 is edited by an operation of a user.

Here, the "edit" includes modification of at least part of a three-dimensional shape by performing processing such as deformation, enlargement, reduction, movement, rotation, addition, deletion, replacement, and composition, on the at least part of the three-dimensional shape.

Also, the "edit" includes modification of an attribute of at least part of a three-dimensional shape by performing processing such as addition, deletion, modification, substitution, and composition on at least part of at least one attribute of color, strength, material quality, and texture assigned to three-dimensional position information.

Also, in the exemplary embodiment, a case will be described where a three-dimensional shape defined in a world coordinate system as an example of the first coordinate system is edited in a local coordinate system as an example of the second coordinate system. Also, a case will be described where in both the world coordinate system and the local coordinate system, the intervals of grids, in which voxels are disposed, in X, Y, Z directions are regular.

In step S106, the coordinates of the three-dimensional shape, edited in step S104, in the local coordinate system are converted into coordinates of the three-dimensional shape in the world coordinate system using arrangement information indicating a positional relationship between multiple voxels that configurate the three-dimensional shape.

Figure 4:
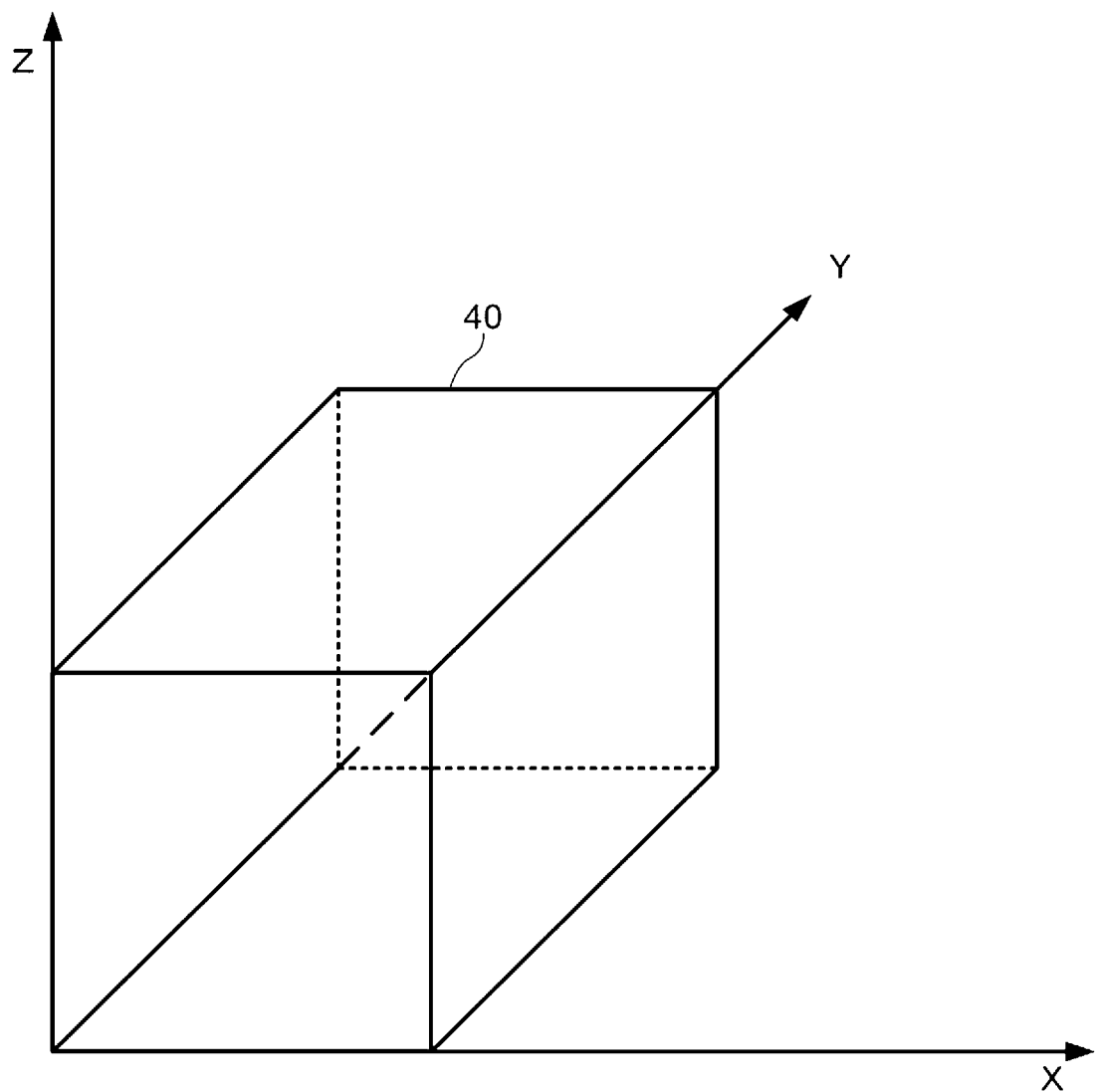
FIG. 4 is a perspective view illustrating an example of a three-dimensional shape.

First, as an example of edit, a case will be described where a three-dimensional shape is reduced and enlarged. In the exemplary embodiment, as an example, a case will be described where a three-dimensional shape to be edited is a rectangular parallelepiped three-dimensional shape 40 as illustrated in FIG. 4. Also, in the exemplary embodiment, in order to simplify description, a case will be described where the three-dimensional shape 40 is edited on the XZ plane as illustrated in FIG. 5.

Figure 5:
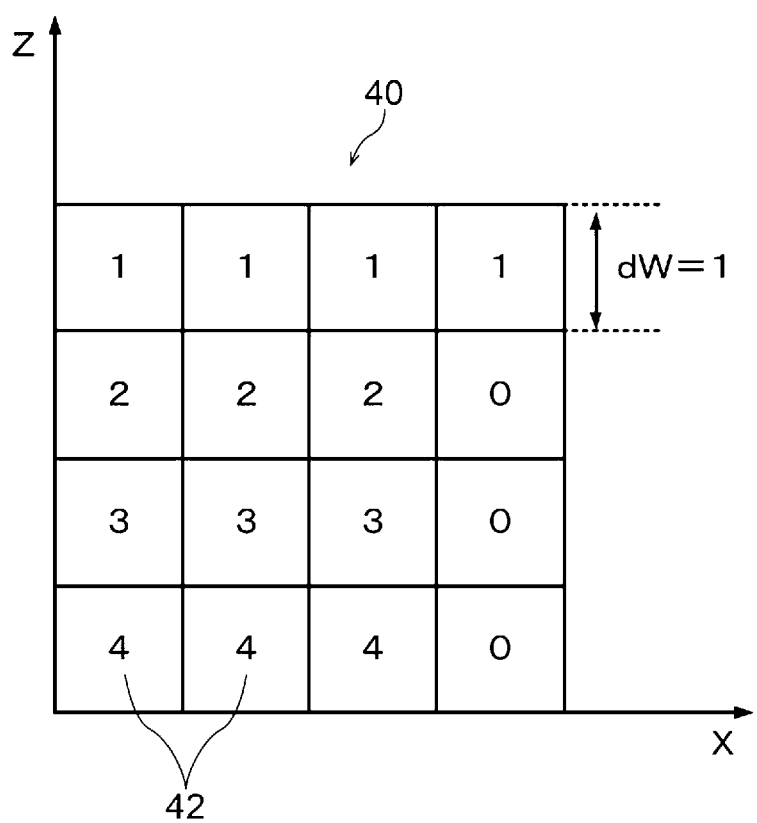
FIG. 5 is a projection view of a three-dimensional shape on XZ-plane.

In the example of FIG. 5, the three-dimensional shape 40 is represented by 4×4 voxels 42 on a two-dimensional plane. It is to be noted that practically, it goes without saying that any three-dimensional shape is configured by a large number of voxels. Also, in the exemplary embodiment, a case will be described where a grid interval dW (the length of each side of each voxel) in the world coordinate system is 1 (the unit is any one, for instance, millimeter) as illustrated in FIG. 5.

FIG. 6 illustrates an example of arrangement information 44 that indicates a positional relationship between the voxels of the three-dimensional shape 40 illustrated in FIG. 5. As illustrated in FIG. 6, the arrangement information 44 indicates a correspondence between the position of each voxel 42, that is, the coordinates of each voxel 42(X, Y, Z), and element value n of each voxel 42 in the world coordinate system with the grid interval dW of 1. It is to be noted that in the example of FIG. 5, the coordinates of the lower left voxel 42 are (1, 1, 1). The arrangement information 44 is stored in the memory 20.

Figure 7:
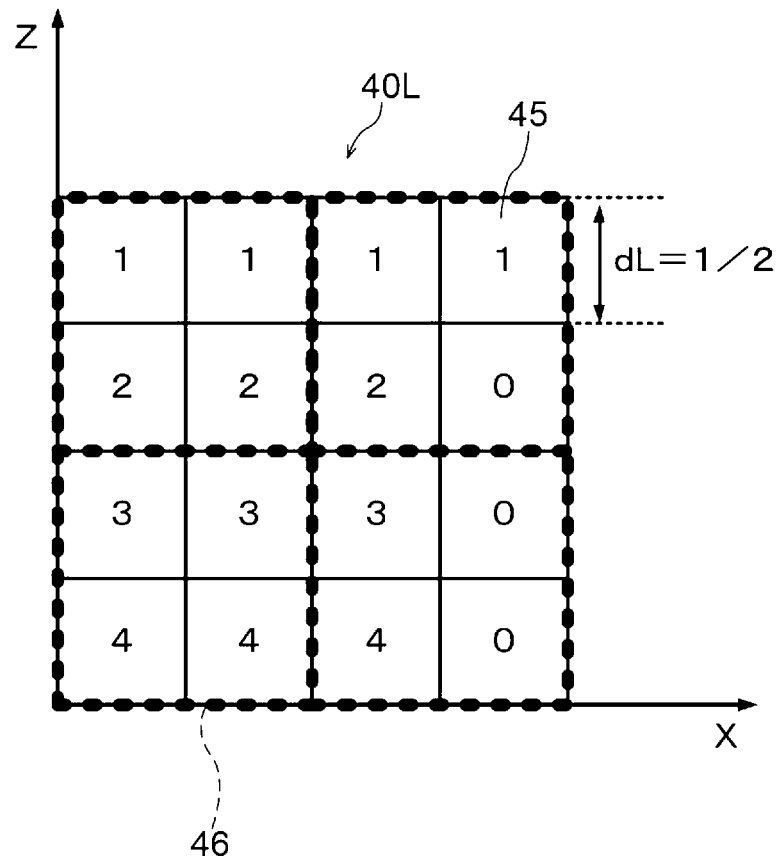
FIG. 7 is a diagram for explaining a case where a three-dimensional shape is reduced in a local coordinate system.

When a user gives instructions for reducing each of the vertical length (the length in the Z direction) and the horizontal length (the length in the X direction) of the three-dimensional shape 40 illustrated in FIG. 5 by ½, the grid interval dL in the local coordinate system becomes ½ as illustrated in FIG. 7.

Since the grid interval dW in the world coordinate system is 1, and the grid interval dL in the local coordinate system is ½, it is not possible to represent the three-dimensional shape 40 in the world coordinate system with the grid interval dW of 1 by using voxels 45 with the grid interval dL of ½, which configurate a three-dimensional shape 40L which is reduced by ½. Thus, the three-dimensional shape 40L is converted into a three-dimensional shape 40W in the world coordinate system using the arrangement information 44.

Figure 8:
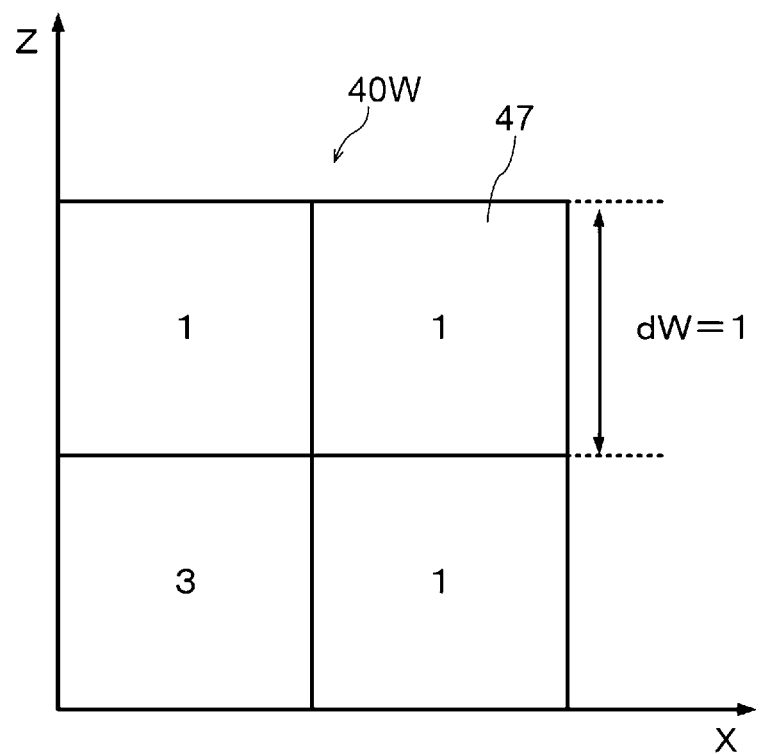
FIG. 8 is a diagram for explaining a case where a three-dimensional shape reduced in the local coordinate system is converted into a three-dimensional shape in a world coordinate system.

Specifically, when voxels are arranged in the three-dimensional shape 40L which is reduced by ½ in accordance with the arrangement information 44, and a voxel is present in a grid which is indicated by a dashed line frame 46 of FIG. 7 and has the grid interval dW of 1 in the world coordinate system, voxels 47, which configurate a three-dimensional shape in the world coordinate system, are arranged as illustrated in FIG. 8.

Here, as illustrated by the dashed line frame 46 of FIG. 7, 2×2 voxels in the three-dimensional shape 40L correspond to one voxel in the world coordinate system. Thus, a representative value of the element values of 2×2 voxels is calculated, and the representative value is defined as the element value of the one voxel in the world coordinate system. Here, as the representative value, for instance, an average value, or a median may be used. However, the representative value is not limited to these. Also, the representative value may be rounded down to the nearest integer, may be rounded up, or may be rounded off. Here, a case may occur where the voxel size in the world coordinate system is indivisible by a voxel size obtained as a consequence of reduction in the local coordinate system. This case will be described later.

Thus, the three-dimensional shape 40L in the local coordinate system of FIG. 7 is converted into the three-dimensional shape 40W in the world coordinate system with the grid interval dW of 1 as illustrated in FIG. 8. It is to be noted that the example of FIG. 8 indicates a case where the representative value is rounded down to the nearest integer.

Figure 9:
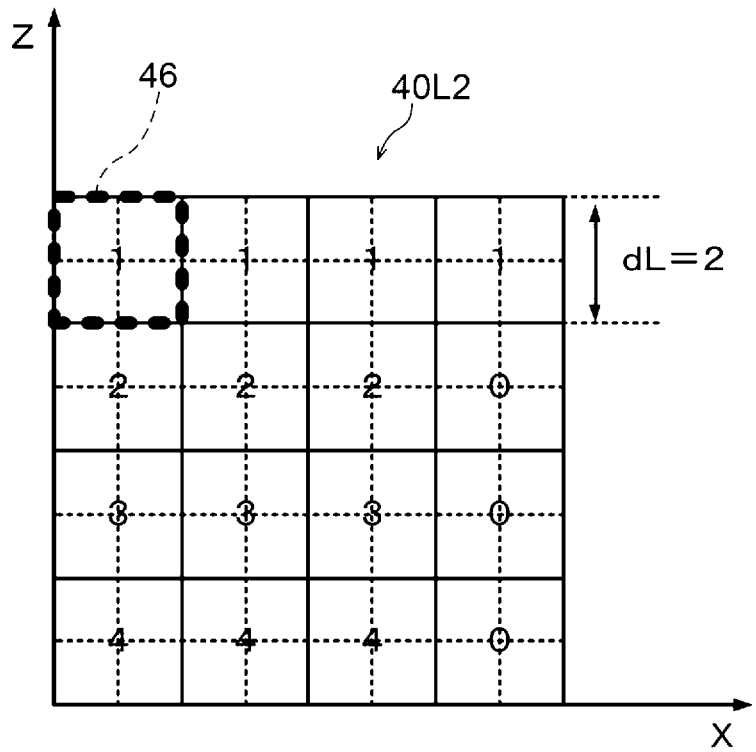
FIG. 9 is a diagram for explaining a case where a reduced three-dimensional shape is enlarged.

Also, when an instruction is given by a user's operation for enlarging the three-dimensional shape 40W illustrated in FIG. 8 by two times in the local coordinate system, the three-dimensional shape 40W is converted into a three-dimensional shape 40L2 as illustrated in FIG. 9 using the arrangement information 44. In this case, the grid interval dL in the local coordinate system is 2.

Figure 10:
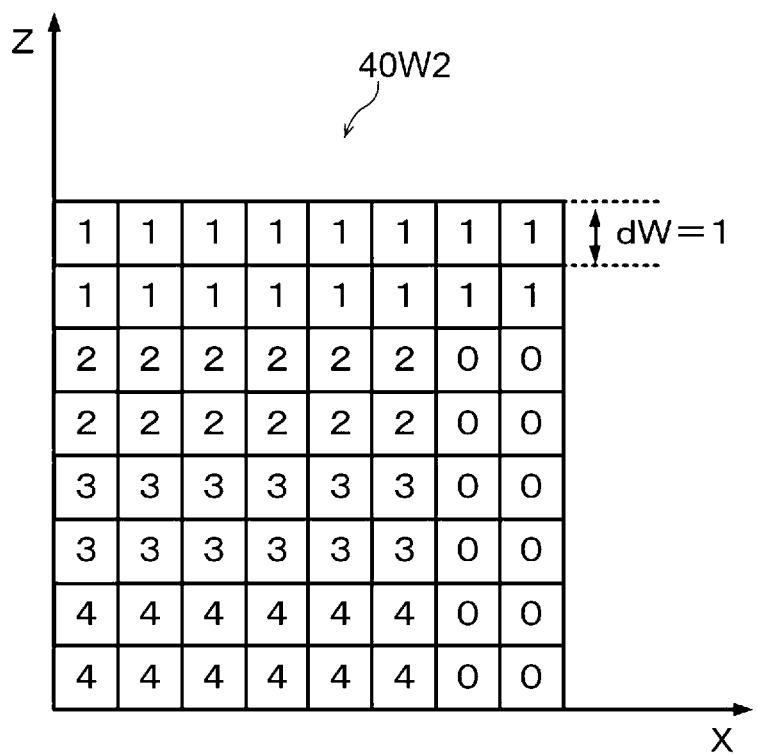
FIG. 10 is a diagram for explaining a case where a reduced three-dimensional shape is enlarged.

Specifically, as illustrated by a dashed line frame 46 of FIG. 9, one voxel in the three-dimensional shape 40L2 corresponds to 2×2 voxels in the world coordinate system. Thus, the element value of each voxel in the local coordinate system is set to the corresponding 2×2 voxels in the world coordinate system using the arrangement information 44, and thus the three-dimensional shape 40L2 is converted into a three-dimensional shape 40W2 as illustrated in FIG. 10. Here, a case may occur where a voxel size obtained as a consequence of enlargement in the local coordinate system is indivisible by the voxel size in the world coordinate system. This case will be described later.

In related art, when 4×4 three-dimensional shape 40 illustrated in FIG. 5 is reduced to 2×2 three-dimensional shape illustrated in FIG. 8, only information on 2×2 voxels is left. Thus, since 2×2 three-dimensional shape 40W is enlarged using the information on 2×2 voxels, it is not possible to enlarge to the original three-dimensional shape 40 faithfully. Here, although the types of the element values of 4×4 voxels before the reduction are four types "1", "2", "3", "4", the types of the element values of 2×2 voxels after the reduction are reduced to only two types "1", "3".

On the other hand, in the exemplary embodiment, enlargement is not made by using the three-dimensional shape 40W illustrated in FIG. 8, but enlargement is made by using the arrangement information 44 indicating the positional relationship between the voxels of the original three-dimensional shape, and thus even when the three-dimensional shape 40 is enlarged after being reduced, a three-dimensional shape which is faithful enlargement of the original three-dimensional shape is obtained. Here, edit is performed without losing the original information so that when a three-dimensional shape, in which the element values of 2×2 voxels after the reduction are represented by only two types "1", "3", is enlarged to 4×4 voxels, the 4×4 voxels are represented by four types, "1", "2", "3", and "4".

Figure 11:
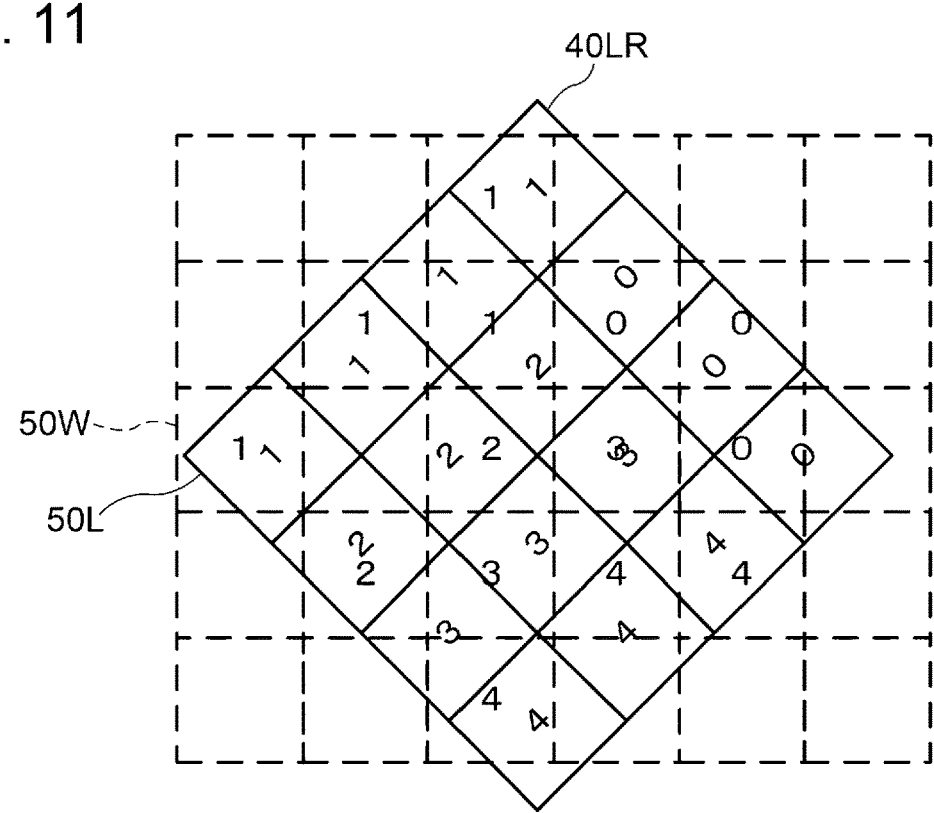
FIG. 11 is a diagram for explaining a case where a three-dimensional shape is rotated.

Next, as an example of edit, a case will be described where a three-dimensional shape is rotated. When an instruction is given by a user's operation for rotating the three-dimensional shape 40 illustrated in FIG. 5 by 45 degrees, a three-dimensional shape 40LR rotated by 45 degrees in the local coordinate system is edited as illustrated in FIG. 11. In this case, for instance, one of the grids indicated by a dashed line in FIG. 11 in the world coordinate system is determined, at which the central point of each voxel of the three-dimensional shape 40LR rotated by 45 degrees is located. Then, an element value of each voxel in the local coordinate system is set to a grid in the world coordinate system, at which the central point of each voxel in the local coordinate system is located.

In the example of FIG. 11, for instance, the central point of a voxel 50L in the local coordinate system is located in a grid 50W in the world coordinate system. Accordingly, a voxel having an element value of 1 is arranged in the grid 50W. Consequently, the three-dimensional shape 40LR rotated by 45 degrees in the local coordinate system is converted into a three-dimensional shape 40WR in the world coordinate system as illustrated by a solid line of FIG. 12.

Figure 12:
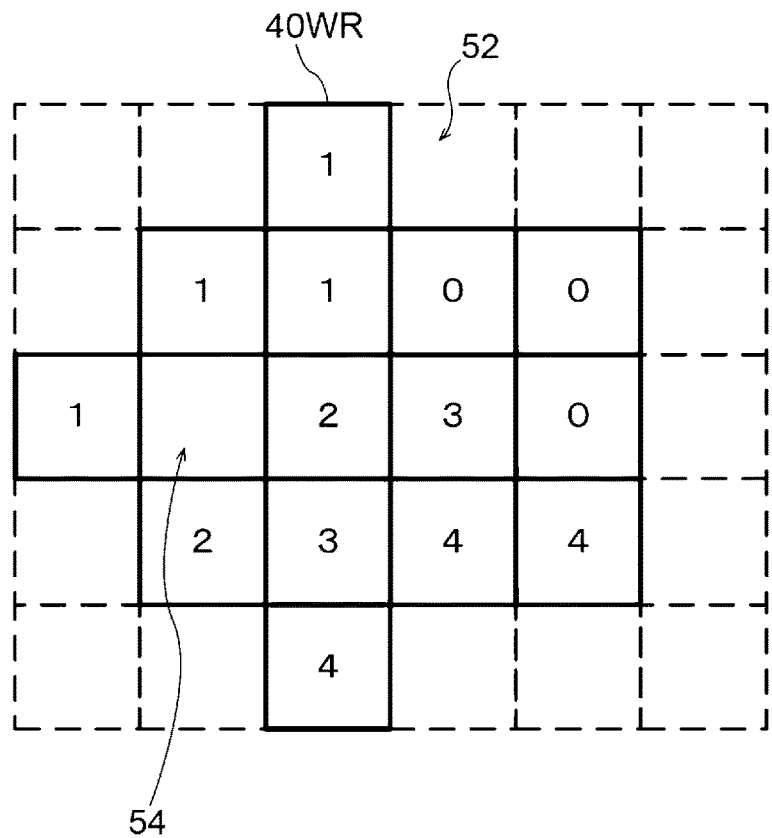
FIG. 12 is a diagram for explaining a level difference and a gap that occur when a three-dimensional shape is rotated.

Here, when the three-dimensional shape 40LR rotated by 45 degrees in the local coordinate system is converted into the three-dimensional shape 40WR in the world coordinate, as illustrated in FIG. 12, at least one of a level difference 52 and a gap 54 may occur.

Figures 13, 14:
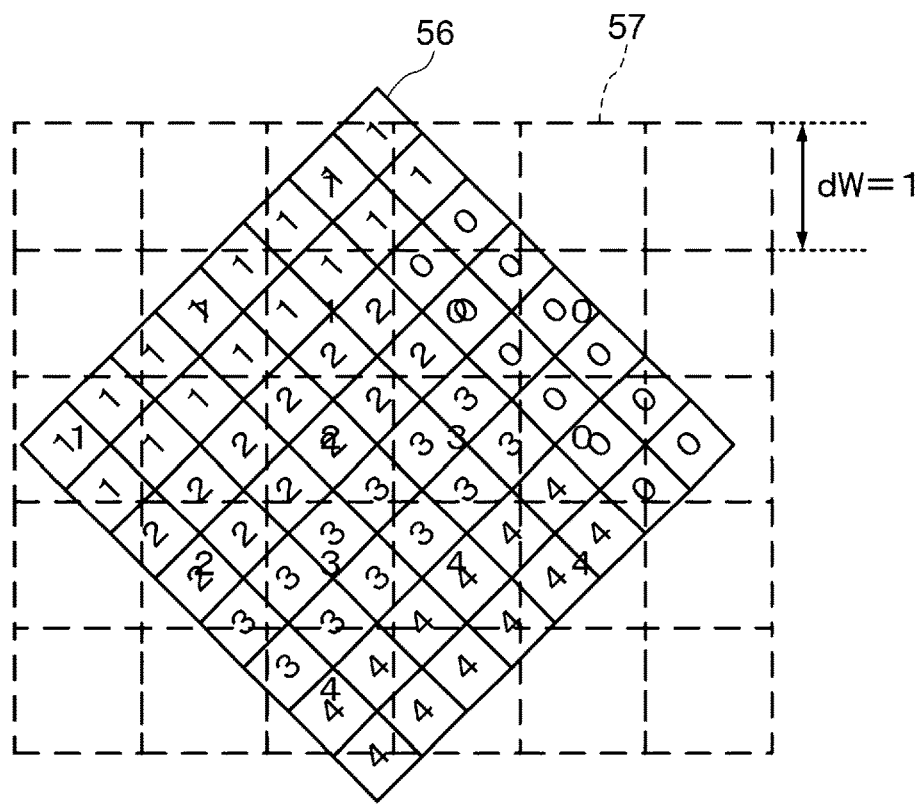
FIG. 13 is a diagram illustrating an example of divided arrangement information.
FIG. 14 is a diagram for explaining a case of conversion to a three-dimensional shape in the world coordinate system using divided arrangement information.

Then, as illustrated in FIG. 13, divided arrangement information 56 is generated, in which the grids are divided by an interval less than the grid interval dW in the world coordinate system, using the arrangement information 44, the three-dimensional shape 40LR rotated by 45 degrees in the local coordinate system is converted into the three-dimensional shape 40WR in the world coordinate using the generated divided arrangement information 56. The divided arrangement information 56 illustrated in FIG. 13 is an example in which the grids are divided by a grid interval G that is ½ the grid interval dW in the world coordinate system.

Figure 15:
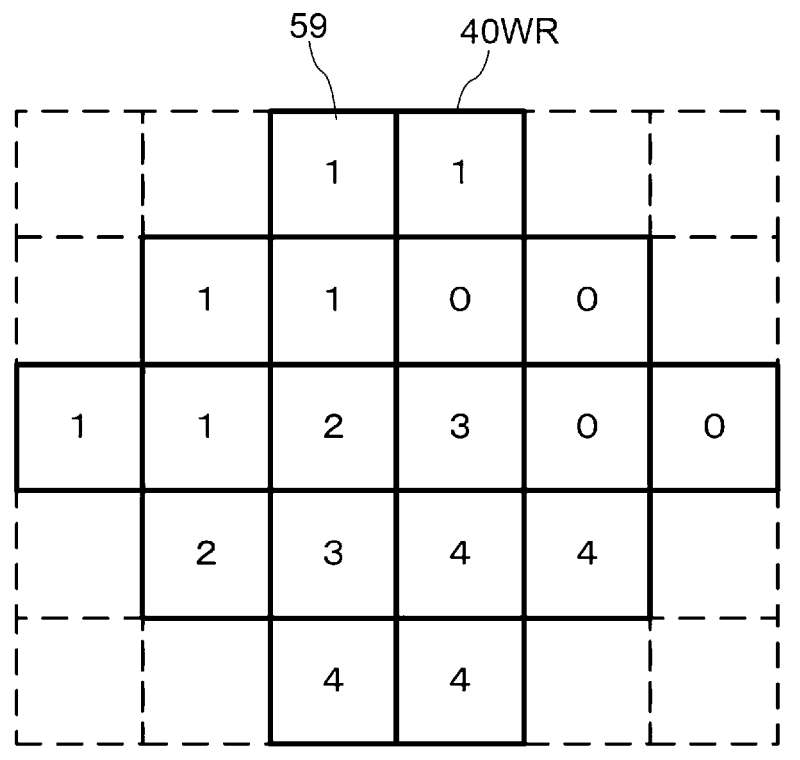

Specifically, when the divided arrangement information 56 is provided for the inside of the three-dimensional shape 40LR rotated by 45 degrees, and the divided arrangement information 56 is provided for the grids with the grid interval dW of 1, which are indicated by a dashed line frame 57 of FIG. 14 and in the world coordinate system, voxels 59, which configurate a three-dimensional shape in the world coordinate system, are arranged (see FIG. 15).

As illustrated in FIG. 14, a voxel is arranged in a grid which is in the world coordinate system and in which the central point of each voxel indicated by the divided arrangement information 56 is located, thereby converting into a three-dimensional shape in the world coordinate system. Thus, as illustrated in FIG. 15, at least one of a level difference and a gap does not occur in the three-dimensional shape 40WR in the world coordinate system.

Also, when a three-dimensional shape after being rotated is enlarged, the grid interval G of the divided arrangement information 56 may be set according to an enlargement factor. For instance, let A be an enlargement factor, divided arrangement information 56, in which the grids are divided by an interval less than the grid interval G expressed by the following Expression (1), is generated, thereby converting into a three-dimensional shape in the world coordinate system.

$$G=(1/A) \times dW \quad (1)$$

Figure 16:
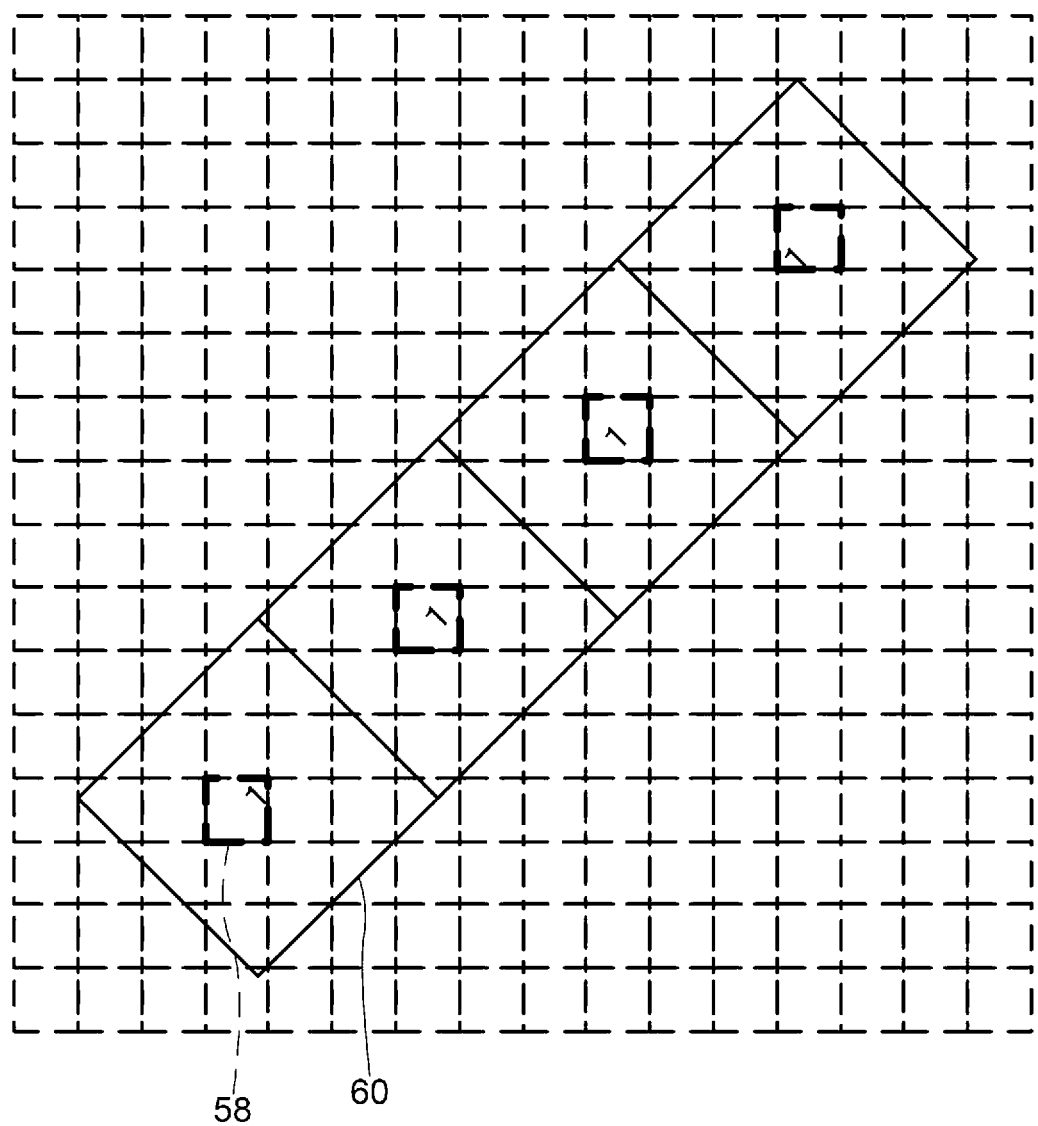
FIG. 16 is a diagram for explaining a case where a rotated three-dimensional shape is enlarged.

For instance, when an enlargement factor A is 8 and voxels are set to the world coordinate system using the arrangement information 44 as it is, voxels are set to only the grids indicated by a dashed line frame 58 of FIG. 16, and thus at least one of a level difference and a gap becomes noticeable. Thus, voxels are set to the world coordinate system using the divided arrangement information 56 in which the grid interval G is set to be less than dW/8 (for instance, 1/16) in accordance with the Expression (1). Specifically, a three-dimensional shape in the world coordinate system is obtained by arranging a voxel at each of positions which are present in the range indicated by a solid line frame 60 of FIG. 16 and indicated by the divided arrangement information 56. Consequently, even when a three-dimensional shape is enlarged after being rotated, occurrence of at least one of a level difference and a gap is reduced.

Next, a case will be described where when a three-dimensional shape is enlarged or reduced, a voxel size obtained as a consequence of editing in the local coordinate system, and a voxel size in the world coordinate system have an indivisible relationship.

Figure 17:
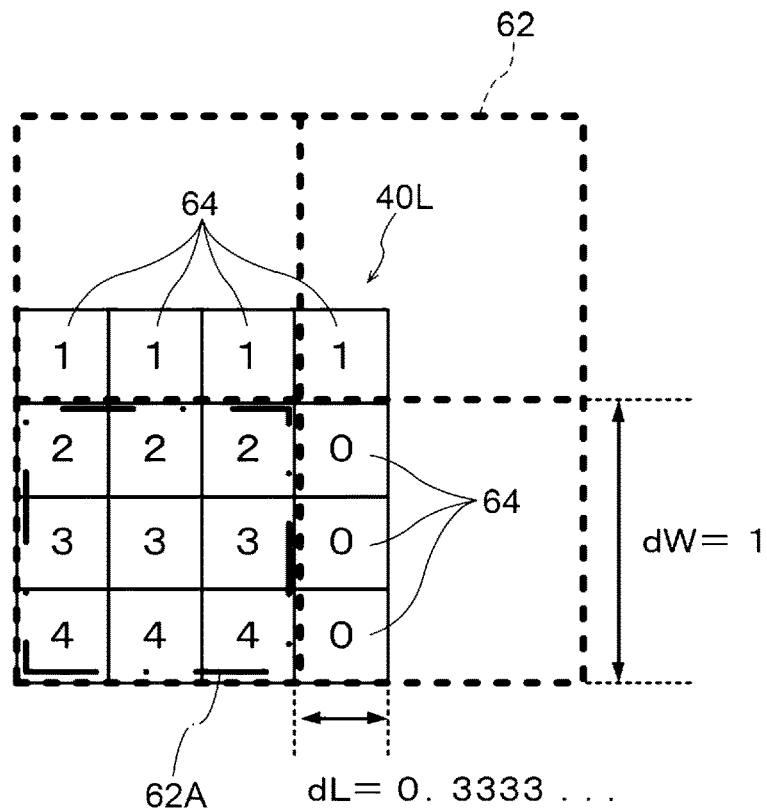
FIG. 17 is a diagram for explaining a case where when a three-dimensional shape is reduced, voxel sizes in the world coordinate system and the local coordinate system have an indivisible relationship.

For instance, when an instruction is given for reducing each of the vertical length (the length in the Z direction) and the horizontal length (the length in the X direction) of the three-dimensional shape 40 illustrated in FIG. 5 by 1/3, as illustrated in FIG. 17, the grid interval dL is 0.3333 . . . , which is indivisible. In this case, similarly to the case of rotation illustrated in FIG. 11, when the divided arrangement information 56 is provided for the inside of the three-dimensional shape 40L after being edited in the local coordinate system, and the divided arrangement information 56 is provided for the grids with the grid interval dW of 1, which are indicated by a dashed line frame 62 of FIG. 17 and in the world coordinate system, voxels, which configurate a three-dimensional shape, may be arranged in the world coordinate system. Consequently, it is possible to convert into a three-dimensional shape 40W in the world coordinate system, in which voxels are arranged in all of four grids indicated by the dashed line frame 62 of FIG. 17. Also, although four voxels each having the grid interval dL of 0.333 . . . gives 1.3333 . . . , as illustrated in FIG. 17, the voxels 64 in one vertical and horizontal row on the outer side may be cut off, and thus conversion to a three-dimensional shape 40W may be performed, in which voxels are arranged in only the grids which are indicated by a dashed-dotted line frame 62A of FIG. 17 and in the world coordinate system.

Figure 18:
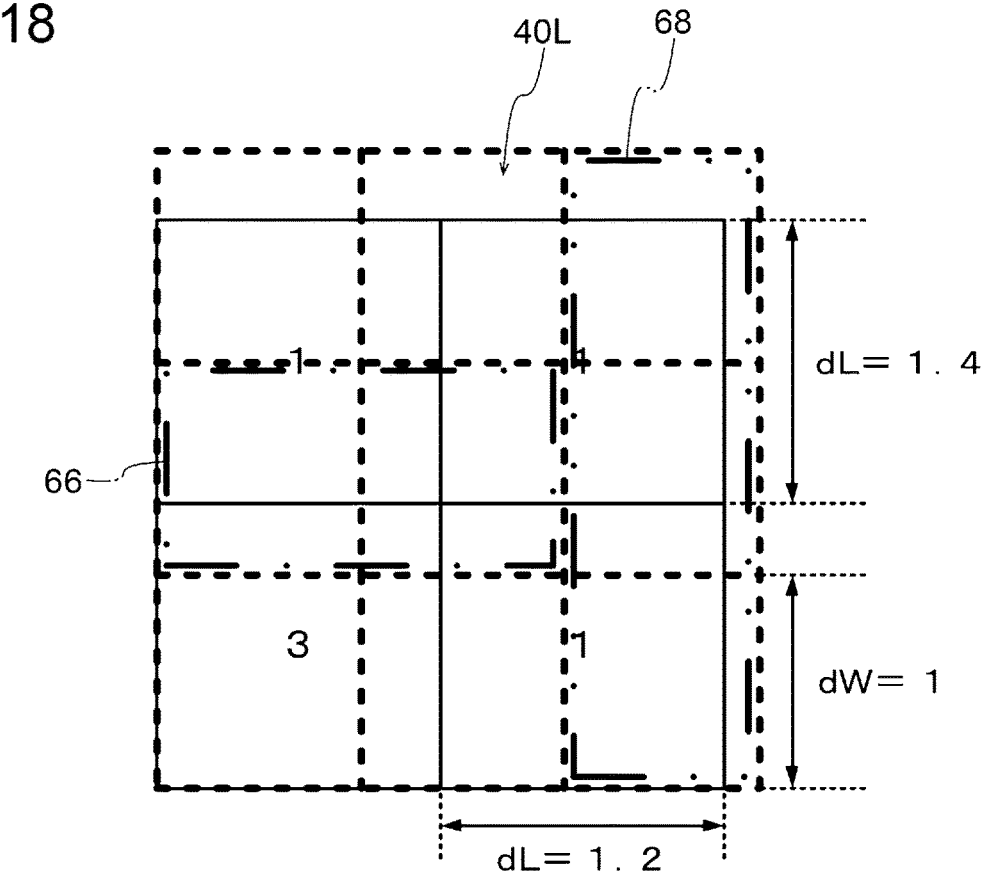
FIG. 18 is a diagram for explaining a case where when a three-dimensional shape is enlarged, voxel sizes in the world coordinate system and the local coordinate system have an indivisible relationship.

Also, when the three-dimensional shape 40W illustrated in FIG. 8 is vertically enlarged by 1.4 times in the local coordinate system, as illustrated in FIG. 18, the arrangement information 56 is not provided for the inside of the three-dimensional shape 40L after being edited in the local coordinate system, and grids (a dashed-dotted line frame 66 of FIG. 18), which are gaps in the world coordinate system, are present. In this case, similarly to the case of enlargement illustrated in FIG. 16, the grid interval G of the divided arrangement information 56, sufficiently small with respect to an enlargement factor is set, thereby reducing occurrence of at least one of a level difference and a gap.

Also, when the three-dimensional shape 40W illustrated in FIG. 8 is horizontally enlarged by 1.2 times in the local coordinate system, and as illustrated in FIG. 18, the arrangement information 56 is not provided for the inside of the three-dimensional shape 40L after being edited in the local coordinate system, the divided arrangement information 56 is provided for the inside of the grids which are indicated by a chain double-dashed line frame 68 of FIG. 18 and in the world coordinate system, by the grid interval G of the divided arrangement information 56, and the voxels may be arranged in the grids, or may be cut off without being included in the frame 68.

In step S108 of FIG. 3, it is determined whether or not an operation for instructing completion is performed. When instructions for completion are provided, the flow proceeds to step S110, and when instructions for completion are not provided, the flow returns to step S102 and the above-described processing is repeated.

In step S110, the three-dimensional shape data after being edited is stored in the memory 20.

In this manner, in the exemplary embodiment, the three-dimensional shape edited in the local coordinate system is converted into a three-dimensional shape in the world coordinate system using the arrangement information 44 that indicates a correspondence between the coordinates of a voxel and an element value. Consequently, a three-dimensional shape adjusted to the world coordinate system is obtained.

It is to be noted that in the exemplary embodiment, although a case has been described where in both the world coordinate system as the first coordinate system and the local coordinate system as the second coordinate system, the intervals of grids in X, Y, Z directions are regular, the present disclosure is applicable to a case where a coordinate system having different intervals of grids in part of directions is used. For instance, the interval of grids in the X, Y, Z directions in the world coordinate system may be (1, 1, 1), and the interval of grids in the X, Y, Z directions in the local coordinate system may be (1, 0.5, 0.5). Also, in this case, a three-dimensional shape edited in the local coordinate system may be converted into a three-dimensional shape in the world coordinate system using the arrangement information 44.

Also, for instance, the first coordinate system may serve as the coordinate system for a three-dimensional modeling device that models a three-dimensional shape, and the second coordinate system may serve as the coordinate system for three-dimensional shaped parts.

Although the present disclosure has been described above using the exemplary embodiment, the present disclosure is not limited to the scope of the exemplary embodiment. Various modifications or improvements may be made to the exemplary embodiment without departing from the gist of the present disclosure, and the exemplary embodiment to which the modifications or improvements are made is also included in the technical scope of the present disclosure.

For instance, the edit processing of three-dimensional shape data illustrated in FIG. 3 may be implemented by hardware such as an application specific integrated circuit (ASIC). In this case, faster processing is achieved as compared with the case where the edit processing is implemented by software.

Also, in the exemplary embodiment, although a case has been described where the editing program for three-dimensional shape data is installed in the ROM 12B, the exemplary embodiment is not limited to this. The editing program for three-dimensional shape data according to the exemplary embodiment may be provided in the form of computer readable medium. For instance, the editing program according to the exemplary embodiment may be provided in the form of recording in an optical disk such as a compact disc (CD)-ROM and a digital versatile disc (DVD)-ROM or in a semiconductor memory such as a universal serial bus (USB) memory and a memory card. Also, the editing program for three-dimensional shape data according to the exemplary embodiment may be obtained from an external device via a communication line connected to the communicator 18.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An editing device for three-dimensional shape data, the editing device comprising:
   at least one processor configured to execute:
      an editor that receives three-dimensional shape data that has been defined in a first coordinate system,
         wherein the three-dimensional shape data comprises data about an original three-dimensional shape comprising a plurality of voxels, and
         wherein the editor edits, in a second coordinate system different from the first coordinate system, the original three-dimensional shape in the first coordinate system, to generate an edited three-dimensional shape; and
      a converter that converts the edited three-dimensional shape, which has been edited by the editor in the second coordinate system, into an edited three-dimensional shape in the first coordinate system using arrangement information that indicates a positional relationship between the plurality of voxels in the original three-dimensional shape and an element value of each of the plurality of voxels,
   wherein in response to the editor rotating, in the second coordinate system, the original three-dimensional shape in the first coordinate system, the converter converts the original three-dimensional shape that has been rotated in the second coordinate system by the editor into the edited three-dimensional shape in the first coordinate system, using divided arrangement information obtained by dividing the arrangement information to have an interval less than a grid interval of the first coordinate system so that at least one of a level difference and a gap does not occur.

2. The editing device for three-dimensional shape data according to claim 1,
   wherein the arrangement information indicates information about the plurality of voxels in terms of an integer 0 or greater, the information about the plurality of voxels of 0 indicates that the plurality of voxels is not present, and the information about the plurality of voxels of 1 or greater numerical value indicates that the plurality of voxels has an attribute corresponding to the numerical value.

3. The editing device for three-dimensional shape data according to claim 2, wherein the attribute corresponding to the numerical value comprises at least one of a material quality of, a color of, and a texture of, a respective one of the plurality of voxels.

4. The editing device for three-dimensional shape data according to claim 1,
   wherein the arrangement information indicates information about the plurality of voxels in terms of an integer 0 or greater, the information about the plurality of voxels of 0 indicates that the plurality of voxels is not present, and the information about the plurality of voxels of 1 or greater numerical value indicates that the plurality of voxels has an attribute corresponding to the numerical value.

5. The editing device for three-dimensional shape data according to claim 1, wherein the arrangement information indicates a correspondence between a position of each of the plurality of voxels and the element value of each of the plurality of voxels in the first coordinate system.

6. The editing device for three-dimensional shape data according to claim 1, wherein the first coordinate system is a world coordinate system, and
   wherein the second coordinate system is a local coordinate system.

7. An editing device for three-dimensional shape data, the editing device comprising:
   at least one processor configured to execute:
      an editor that receives three-dimensional shape data that has been defined in a first coordinate system,
         wherein the three-dimensional shape data comprises data about an original three-dimensional shape comprising a plurality of voxels, and
         wherein the editor edits, in a second coordinate system different from the first coordinate system, the original three-dimensional shape in the first coordinate system, to generate an edited three-dimensional shape; and
      a converter that converts the edited three-dimensional shape, which has been edited by the editor in the second coordinate system, into an edited three-dimensional shape in the first coordinate system using arrangement information that indicates a positional relationship between the plurality of voxels in the original three-dimensional shape and an element value of each of the plurality of voxels,
   wherein in response to the editor enlarging, in the second coordinate system, the original three-dimensional shape in the first coordinate system, the converter converts the original three-dimensional shape that has been enlarged in the second coordinate system by the editor into the edited three-dimensional shape in the first coordinate system, using divided arrangement information obtained by dividing the arrangement information to have an interval less than a grid interval of the first coordinate system so that at least one of a level difference and a gap does not occur.

8. The editing device for three-dimensional shape data according to claim 7,
wherein the arrangement information indicates information about the plurality of voxels in terms of an integer 0 or greater, the information about the plurality of voxels of 0 indicates that the plurality of voxels is not present, and the information about the plurality of voxels of 1 or greater numerical value indicates that the plurality of voxels has an attribute corresponding to the numerical value.

9. An editing device for three-dimensional shape data, the editing device comprising:
at least one processor configured to execute:
an editor that receives three-dimensional shape data that has been defined in a first coordinate system,
wherein the three-dimensional shape data comprises data about an original three-dimensional shape comprising a plurality of voxels, and
wherein the editor edits, in a second coordinate system different from the first coordinate system, the original three-dimensional shape in the first coordinate system, to generate an edited three-dimensional shape; and
a converter that converts the edited three-dimensional shape, which has been edited by the editor in the second coordinate system, into an edited three-dimensional shape in the first coordinate system using arrangement information that indicates a positional relationship between the plurality of voxels in the original three-dimensional shape and an element value of each of the plurality of voxels,
wherein in response to the editor reducing, in the second coordinate system, the original three-dimensional shape in the first coordinate system, the converter converts the original three-dimensional shape that has been reduced in the second coordinate system by the editor into the edited three-dimensional shape in the first coordinate system using the arrangement information, and
wherein in response to the editor enlarging, in the second coordinate system, the edited three-dimensional shape in the first coordinate system, the converter converts the three-dimensional shape that has been enlarged in the second coordinate system by the editor into a second edited three-dimensional shape in the first coordinate system using the arrangement information.

10. The editing device for three-dimensional shape data according to claim 9,
wherein the arrangement information indicates information about the plurality of voxels in terms of an integer 0 or greater, the information about the plurality of voxels of 0 indicates that the plurality of voxels is not present, and the information about the plurality of voxels of 1 or greater numerical value indicates that the plurality of voxels has an attribute corresponding to the numerical value.

11. A non-transitory computer readable medium storing a three-dimensional shape-data editing program that, when executed, causes a computer to execute a process, the process comprising:
receiving, by at least one processor, three-dimensional shape data that has been defined in a first coordinate system,
wherein the three-dimensional shape data comprises data about an original three-dimensional shape comprising a plurality of voxels,
editing, by the at least one processor, in a second coordinate system different from the first coordinate system, the original three-dimensional shape in the first coordinate system, to generate an edited three-dimensional shape; and
converting, by the at least one processor, the edited three-dimensional shape, which has been edited by the editing in the second coordinate system, into an edited three-dimensional shape in the first coordinate system using arrangement information that indicates a positional relationship between the plurality of voxels in the original three-dimensional shape and an element value of each of the plurality of voxels,
wherein in response to the editing rotating, in the second coordinate system, the original three-dimensional shape in the first coordinate system, the converting converts the original three-dimensional shape that has been rotated in the second coordinate system by the editing into the edited three-dimensional shape in the first coordinate system, using divided arrangement information obtained by dividing the arrangement information to have an interval less than a grid interval of the first coordinate system so that at least one of a level difference and a gap does not occur.

* * * * *